Aug. 18, 1931.                C. R. PALMER ET AL                 1,819,919
                                  THERMOMETER
                               Filed July 26, 1929

INVENTORS
Charles R. Palmer
BY  Curtis P. Mitchell

Wood & Wood   ATTORNEYS

Patented Aug. 18, 1931

1,819,919

UNITED STATES PATENT OFFICE

CHARLES R. PALMER AND CURTIS P. MITCHELL, OF CINCINNATI, OHIO, ASSIGNORS TO THE PALMER COMPANY, OF ST. BERNARD, OHIO, A CORPORATION OF OHIO

THERMOMETER

Application filed July 26, 1929. Serial No. 381,152.

This invention relates to thermometers of the type which register or indicate temperature by the rise and fall of a liquid enclosed in a tube. The conventional mercury thermometer is a good example of the general class to which this invention is directed. More particularly, the invention relates to thermometer tubing wherein the height of the mercury is more readily apparent to the observer by virtue of the construction of the tube itself.

The invention is disclosed in relation to a mercury column in a glass tube since it is these materials which are conventionally used in making the most accurate thermometers, though it must be understood that the invention might be used with other transparencies and other liquid columns should they be developed as substitutes for the glass or for the mercury.

The object of the invention is to provide thermometer tubing in which the mercury is readily visible.

Another object of the invention is to provide a thermometer of the type disclosed, which provides the illusion of colored mercury.

Other objects and advantages will be more fully apparent from a description of the accompanying drawings, in which.

Figure 3:
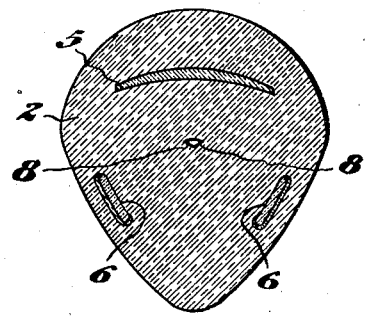

Figure 3 discloses a slightly modified form of thermometer tube in cross section.

The invention comprises providing a stripe of color substantially parallel to the bore of the thermometer tube, said color stripe being disposed to be reflected by the column of mercury through the reading face of the thermometer.

To avoid confusion in reading the thermometer, it is desirable to shield or conceal the color stripe from the reading face of the thermometer so that the observer sees only the reflection of the color stripe and cannot see the color stripe directly.

It is likewise expedient that the reading face of the thermometer tube be configurated to form a lens to provide the observer with a magnified image of the color stripe to whatever height the mercury may be.

It is likewise preferable to dispose a stripe of contrasting color behind the bore as viewed from the reading face in order that the reflection of the color stripe stands out with the greatest contrast.

The wider the reflection of the color stripe, the easier it is to read the thermometer and it is therefore desirable that the forward side of the bore of the thermometer be configurated in relation to the color stripe to reflect as wide a band of light as possible through the reading face of the thermometer.

Figure 1:
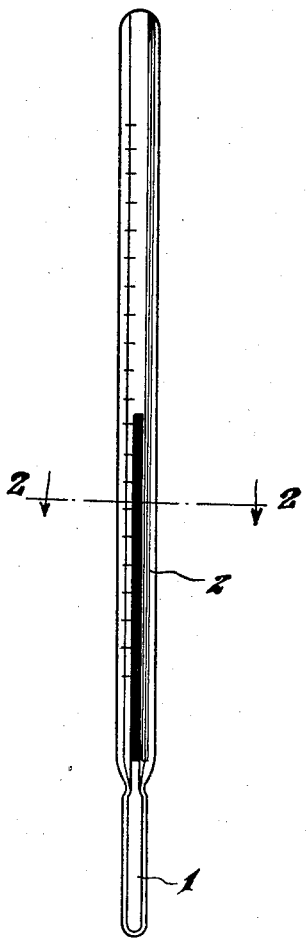
Figure 1 is a front elevation disclosing the invention as applied to a clinical thermometer.

In detail, Figure 1 discloses a bulb 1 adapted to house the thermally expansible liquid, the tube 2 and the bore 3 in which the expansible liquid is adapted to rise and fall. As disclosed, a scale is provided on the reading face of the thermometer.

Figure 2:
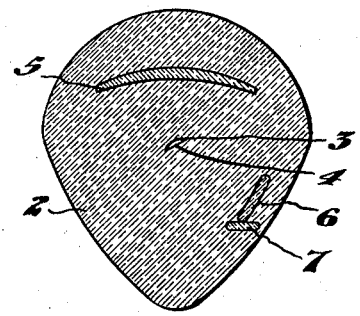
Figure 2 is an enlarged section on line 2—2 of Figure 1.

As disclosed in Figure 2, the bore is configurated on its forward side into a face or panel 4 so that the mercury reflects an image without too great a scattering of rays. It is to be noted in Figures 2 and 3 that the tube is so shaped in cross section that the portion bounded by the reading face constitutes a lens adapted to magnify the image of the bore or the liquid in the bore.

Behind the bore is a color stripe 5 which may be white enamel. This is the color stripe which is adapted to provide the contrasting color and is not the color stripe adapted to be reflected. The color stripe adapted to be reflected is 6 and is placed forwardly of the bore and laterally of the bore as viewed from the reading surface of the tube.

Generally speaking, the color stripe is placed in relation to the bore and the mercury column that it is reflected through the reading face of the thermometer. As specifically disclosed the color stripe, the magnifying lens of the thermometer, and the face of the bore are disposed to each other that the reflection of the color stripe by the mercury in the bore directs the image of the color stripe through the lens of the thermometer. A shield or curtain 7 is provided between this color stripe 6 and the reading face of the thermometer so that the observer in looking through the lens at the mercury column, does not readily see the color stripe itself, but only a reflection of a portion of the color stripe, the portion being determined by the height of the mercury in the bore.

As disclosed in Figure 2, the bore is substantially semicircular, the flat face being disposed to the center of the color stripe and the center of the lens so that the mercury in the bore reflects the color stripe through the lens.

As disclosed in Figure 3, two color stripes to be reflected are provided, one on each side of the line between the center of the lens and the center of the bore, and the bore is roughly triangular in cross section in order that the mercury in the bore may reflect both color stripes through the lens. In all cases, however, it is undesirable to provide sharp angles or corners in the bore, and the walls of the bore are therefore preferably somewhat rounded.

As disclosed in the figures, the color stripes, shields and contrasting colors are disposed immediately in the tubing itself and are of material similar to the tube itself, that is, colored glass, enamel or the like.

The essence of the invention is that the thermometer tube is provided with a longitudinal stripe coordinate in extent, at least with the portion of the tube to be read by the observer. This color stripe is the object from which the light emanates which indicates the temperature, or otherwise expressed, the observer in looking through the lens of the thermometer sees a reflection of the color stripe to whatever height the mercury column may be and no higher.

This thermometer is very easily read for the reason that, for instance, if the contrasting stripe 5 be of white enamel and the stripe 6 to be reflected be of red glass, then the thermometer provides the illusion of a column of red mercury rising and falling in front of a white background. Of course, other colors may be selected if desired.

From the foregoing it is manifest that the underlying concept of this invention comprises the application of the principle of a mirror to an otherwise conventional thermometer, in which the mercury column, or other equivalent body has the property of providing a reflecting surface, the object or the color selected to create the illusion and to constitute the easily read temperature indication, being observable to the reader only as reflected from the surface of the mercury column in the duct of the transparent tube.

Having described our invention, we claim:

1. A thermometer, comprising a tube having a longitudinal bore, and a color stripe arranged parallel with the bore so that the rising mercury in the tube reflects the color stripe toward the reading side of the tube.

2. An article of manufacture, comprising a glass thermometer tube having a bore, and a color stripe parallel to the bore, so arranged that a reflective fluid in the bore will reflect the color stripe toward the reading side of the tube.

3. A thermometer, comprising, a glass tube having a bore, and a color stripe parallel to the bore, so arranged that a column of reflective fluid in the bore will reflect the color stripe through the reading face of the tube, and means adapted to hide said stripe from the reading side of the tube.

4. A thermometer, comprising, a tube, a thermally expansible liquid in said tube, said liquid adapted to reflect light, and an object to be reflected extending parallel to the column of liquid in the tube, means for concealing said object from the reading face of the tube, said body so disposed that it is reflected by the liquid in the tube through the reading face from which it is concealed.

5. A mercury thermometer adapted to provide the illusion of colored mercury, said thermometer, comprising, a mercury bulb and a tube in which the mercury is adapted to rise and fall responsively to temperature changes, and a stripe of color associated with the tube and running approximately the length thereof, said stripe adapted to be reflected by the mercury column through the reading face of the thermometer to whatever height the mercury may be.

6. A thermometer comprising a glass tube having a lens portion, the bore of the tube being shaped to provide a panel facing slightly to one side of the lens, and a colored glass stripe incorporated in said tube disposed to one side of the panel so that a light reflecting fluid in the bore reflects the colored glass stripe through the lens.

7. A thermometer comprising a glass tube having a lens portion, the bore of the tube being shaped to provide a panel facing slightly to one side of the lens, a colored glass stripe incorporated in said tube disposed to one side of the panel so that a light reflecting fluid in the bore reflects the colored glass stripe through the lens, and a section of opaque glass disposed between the color stripe and the reading face of the thermometer.

8. A thermometer tube formed to provide a lens portion and a duct formed with a relatively flattened wall, the duct adapted to contain a temperature responsive fluid having a light reflecting surface, a color stripe associated with the tube and so arranged in relation to the lens and the flattened wall of the duct that a ray of light traveling from the stripe to the flattened wall will be reflected by the temperature responsive fluid through the lens.

9. A thermometer tube formed to provide a lens portion and a duct formed with a relatively flattened wall, the duct adapted to contain a temperature responsive fluid having a light reflecting surface, a color stripe associated with the tube and so arranged with relation to the lens and the flattened wall of the duct that a ray of light traveling from the stripe to the flattened wall will be reflected by the temperature responsive fluid through the lens, and means associated in relation to the color stripe and the lens rendering the color stripe visible through the lens only as reflected from the column of the temperature responsive fluid.

10. A thermometer tube formed to provide a lens portion and a duct substantially semicircular in cross section providing a relatively flattened wall, said duct being adapted to contain a temperature responsive fluid having a light reflecting surface, a color stripe associated with the tube and so arranged in relation to the lens and the relatively flattened wall of the duct that a ray of light traveling from the stripe to the flattened wall will be reflected by the temperature responsive fluid through the lens, and means rendering the said color stripe invisible through the lens except as reflected from the temperature responsive fluid.

In witness whereof, we hereunto subscribe our names.

CHARLES R. PALMER.
CURTIS P. MITCHELL.